(12) United States Patent
Wagner et al.

(10) Patent No.: US 10,284,369 B2
(45) Date of Patent: *May 7, 2019

(54) SECURE APP-TO-APP COMMUNICATION

(71) Applicant: MOBILE IRON, INC., Mountain View, CA (US)

(72) Inventors: Thomas Edward Wagner, San Jose, CA (US); Robert Elliott Whiteman, San Francisco, CA (US)

(73) Assignee: MOBILE IRON, INC., Mountain View, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 15/639,012

(22) Filed: Jun. 30, 2017

(65) Prior Publication Data
US 2017/0302449 A1    Oct. 19, 2017

Related U.S. Application Data

(63) Continuation of application No. 14/195,727, filed on Mar. 3, 2014.
(Continued)

(51) Int. Cl.
*G06F 21/60* (2013.01)
*H04L 9/30* (2006.01)
(Continued)

(52) U.S. Cl.
CPC ............... *H04L 9/30* (2013.01); *G06F 21/60* (2013.01); *H04L 9/0822* (2013.01);
(Continued)

(58) Field of Classification Search
CPC .......... H04W 4/00; H04L 9/08; H04L 63/061; G06F 21/60; G06F 21/62; G06F 21/629
See application file for complete search history.

(56) References Cited

U.S. PATENT DOCUMENTS 8,745,390 B1 * 6/2014 Atwood ................ H04L 63/061
  713/169
8,832,254 B1 * 9/2014 Sobel ..................... H04L 67/16
  709/203
(Continued)

FOREIGN PATENT DOCUMENTS

EP    1858193    5/2011
EP    2393033   12/2011
(Continued)

OTHER PUBLICATIONS

Mithilesh Kumar, Sharing data among iOS applications using UIPasteboard, Mar. 21, 2012, http://kmithi.blogspot.com/2012/03/sharingdataamongiosapplications.html.*
(Continued)

*Primary Examiner* — Khang Do
(74) *Attorney, Agent, or Firm* — Van Pelt, Yi & James LLP

(57) ABSTRACT

Secure application-to-application communication is disclosed. A shared encryption key may be used to encrypt data to be transferred from a first mobile application to a second mobile application. The encrypted data is provided to a shared storage location. The second mobile application is configured to retrieve the encrypted data from the shared storage location.

25 Claims, 10 Drawing Sheets

Related U.S. Application Data

(60) Provisional application No. 61/771,498, filed on Mar. 1, 2013.

(51) Int. Cl.
  *H04L 9/08* (2006.01)
  *H04L 29/06* (2006.01)
  *H04W 4/00* (2018.01)

(52) U.S. Cl.
  CPC ...... *H04L 63/061* (2013.01); *H04L 2463/062* (2013.01); *H04W 4/00* (2013.01)

(56) References Cited

U.S. PATENT DOCUMENTS

| | | | |
|---|---|---|---|
| 8,839,266 B1* | 9/2014 | Partridge | G06F 13/00 |
| | | | 719/310 |
| 2002/0197979 A1* | 12/2002 | Vanderveen | H04L 63/1416 |
| | | | 455/410 |
| 2004/0228492 A1 | 11/2004 | Park | |
| 2007/0300289 A1 | 12/2007 | Tanizawa | |
| 2008/0046983 A1 | 2/2008 | Lester | |
| 2008/0134347 A1 | 6/2008 | Goyal | |
| 2008/0240440 A1 | 10/2008 | Rose | |
| 2009/0100264 A1* | 4/2009 | Futa | H04L 9/0844 |
| | | | 713/170 |
| 2009/0327825 A1 | 12/2009 | Natsuno | |
| 2010/0306076 A1 | 12/2010 | Taveau | |
| 2011/0154015 A1 | 6/2011 | Rahman | |
| 2011/0179268 A1 | 7/2011 | Strom | |
| 2011/0213980 A1 | 9/2011 | Surace | |
| 2011/0246374 A1 | 10/2011 | Franz | |
| 2011/0314284 A1 | 12/2011 | Chou | |
| 2012/0066767 A1 | 3/2012 | Vimpari | |
| 2012/0221738 A1 | 8/2012 | Schroeder, Jr. | |
| 2012/0226913 A1* | 9/2012 | Park | G06F 21/10 |
| | | | 713/189 |
| 2012/0291114 A1 | 11/2012 | Poliashenko | |
| 2012/0300932 A1 | 11/2012 | Cambridge | |
| 2012/0302212 A1 | 11/2012 | Ross | |
| 2013/0091543 A1 | 4/2013 | Wade | |
| 2013/0111207 A1 | 5/2013 | Von Behren | |
| 2013/0145455 A1 | 6/2013 | Vijayshankar | |
| 2013/0198510 A1 | 8/2013 | Rahman | |
| 2013/0275560 A1* | 10/2013 | Bestmann | H04L 41/08 |
| | | | 709/219 |
| 2013/0298185 A1 | 11/2013 | Koneru | |
| 2014/0032733 A1* | 1/2014 | Barton | H04L 41/00 |
| | | | 709/223 |
| 2014/0059642 A1* | 2/2014 | Deasy | G06F 21/53 |
| | | | 726/1 |
| 2014/0068273 A1* | 3/2014 | Sobel | G06F 21/604 |
| | | | 713/189 |
| 2014/0068593 A1 | 3/2014 | McErlane | |
| 2014/0259028 A1* | 9/2014 | Atwood | G06F 9/543 |
| | | | 719/313 |
| 2014/0337628 A1* | 11/2014 | Amato | H04L 9/0825 |
| | | | 713/171 |
| 2015/0222637 A1 | 8/2015 | Hung | |

FOREIGN PATENT DOCUMENTS

| | | |
|---|---|---|
| WO | PCT-2005125072 | 12/2005 |
| WO | WO-2012039178 | 2/2014 |

OTHER PUBLICATIONS

Christof Paar, Understnading Cryptography, Publisher: Springer; 1st ed. 2010 edition (Oct. 19, 2011), p. 207.*
Citrix: "Citrix XenMobile Technology Overview White Paper" Citrix White papers on line, Jul. 31, 2012 (Jul. 31, 2012), pp. 1-14, Retrieved from the Internet: URL: http://www.insight.com/content/dam/insight/en_US/pdfs/citrix/xenmobile-tech-overview.pdf [retrieved on Jan. 27, 2014].
Author Unknown, Facebook Login, Facebook Developers, Jan. 25, 2013 http://web.archive.org/web/20130125010144/https://developers.facebook.com/docs/howto.
Bruce Schneier, Applied Cryptography, 1996, Wiley, p. 432.
Paar, Understanding Cryptography, Oct. 19, 2011, Springer; 1st ed. 2010 edition.
Schneier, Applied Cryptography, Oct. 18, 1996, publisher: Wiley; 2nd edition.
Schneier, Applied Cryptography, 1996, p. 430.
U.S. Appl. No. 14/137,745, Final Office Action, dated Sep. 12, 2014.
U.S. Appl. No. 14/137,845, Office Action, dated Oct. 2, 2014.
U.S. Appl. No. 14/137,845, Secure Mobile APP Connection Bus, filed Dec. 20, 2013.
U.S. Appl. No. 14/137,745, Office Action dated Mar. 10, 2014.
U.S. Appl. No. 14/137,745, Secured Mobile APP Connection Bus, filed Dec. 20, 2013.
Wordpress, UIPasteBoard to implement copy, paste in your app, 2010, http://mobappdevelopment.wordpress.com/2010/06/21/uipasteboard-to-implement-copy-paste-in-your-app/.
Yann Lechelle, GitHub, OpenUDID, Aug. 28, 2011 http://github.com/ylechelle/OpenUDID/blob/master/OpenUDID.m.
Yann Lechelle, GitHub, OpenUDID, Open Source Initiative for Universal and Persistant UDID Solution for iOS, Aug. 28, 2011 https://github.com/ylechelle/OpenUDID.

* cited by examiner

US 10,284,369 B2

SECURE APP-TO-APP COMMUNICATION

CROSS REFERENCE TO OTHER APPLICATIONS

This application is a continuation of co-pending U.S. patent application Ser. No. 14/195,727, entitled SECURE APP-TO-APP COMMUNICATION, filed Mar. 3, 2014, which claims priority to U.S. Provisional Patent Application No. 61/771,498, entitled SECURE APP-TO-APP COMMUNICATION, filed Mar. 1, 2013, both of which are incorporated herein by reference for all purposes.

BACKGROUND OF THE INVENTION

Mobile devices, such as smartphones and tablets, may include multiple applications from a variety of sources including a trusted app store, a third-party app store, an enterprise in-house developer, and/or other sources. And, each application may have a unique approach to managing its configuration, policies, data, and/or other attributes. In certain cases, one or more applications may be managed within a mobile device management (MDM) framework including, for example, a management agent on the mobile device and/or management server. Secure communication between different types of applications is helpful to the proper functioning of a mobile device.

BRIEF DESCRIPTION OF THE DRAWINGS

Various embodiments of the invention are disclosed in the following detailed description and the accompanying drawings.

DETAILED DESCRIPTION

Figure 1:
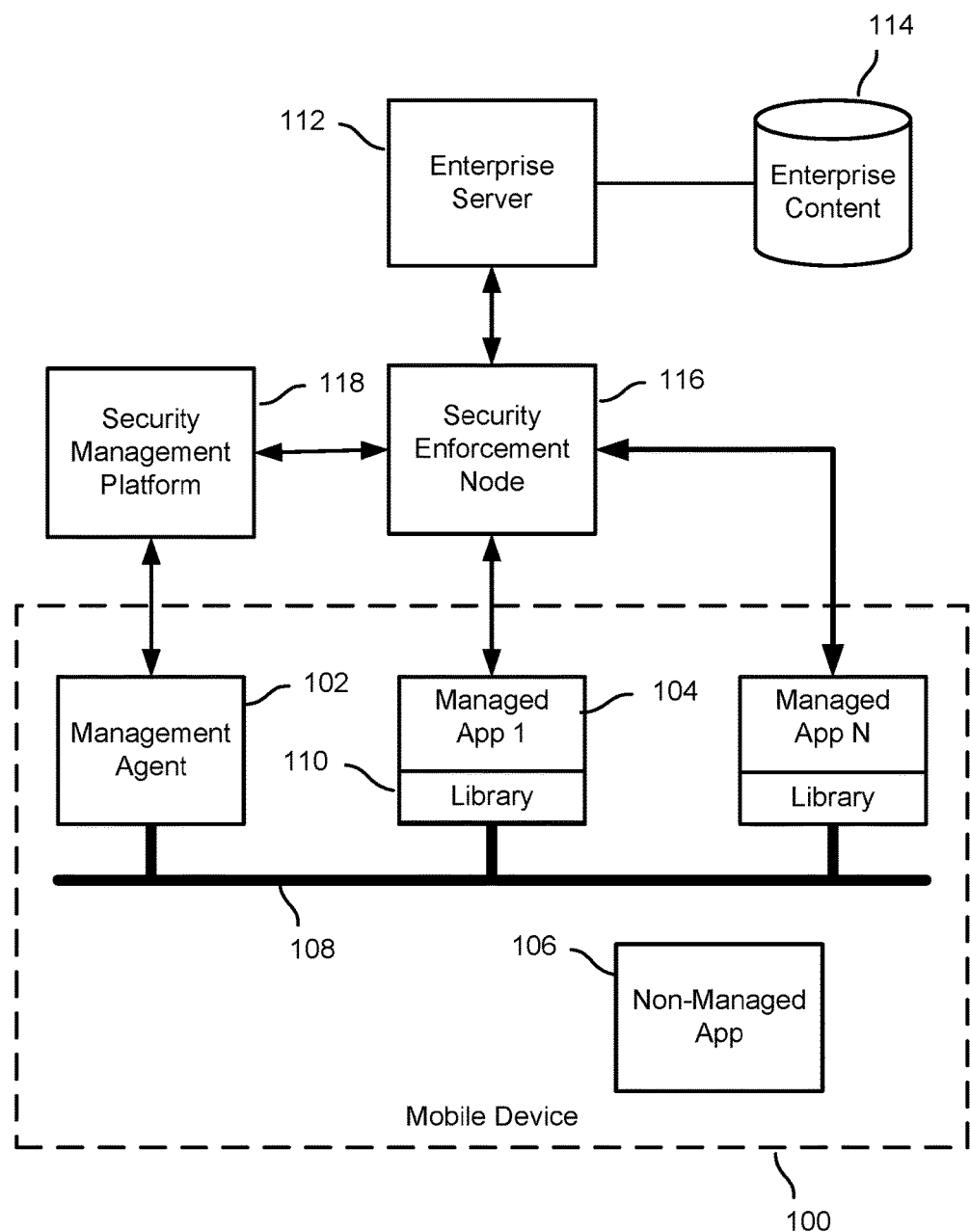
FIG. 1 is a block diagram illustrating an embodiment of a system including a secure application-to-application connection bus.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Secure application-to-application communication is disclosed. In various embodiments, a secure mobile application connection bus (e.g., secure inter-application connection bus) may be used to securely transfer information (e.g., commands, configuration information, policies) between applications. In some embodiments, the techniques disclosed herein allow a management server and a trusted management agent installed on the device (e.g., a management app) to have a two-way secure application connection bus to manage applications (e.g., application configurations, policies, etc.) on a mobile device while maintaining a seamless user experience. For example, the secure connection bus may be used to transfer commands/information securely between managed application(s) and a trusted management agent running on the mobile device.

According to various embodiments, a secure application connection bus is established by exchanging information needed to transfer data in an encrypted form via a storage location (e.g., a named pasteboard, keychain) accessible to the sending and receiving app(s). In some embodiments, a shared encryption key may be used to encrypt data to be transferred from a first mobile application to a second mobile application. The encrypted data is provided to a shared storage location. The second mobile application is configured to retrieve the encrypted data from the shared storage location.

Using these techniques, data may be transferred securely between the first mobile application and the second mobile application via the shared storage location. In various embodiments, the path (e.g., tunnel), technique, and/or process of secure transfer between the first mobile application, shared storage location, and/or second application may include a secure application connection bus. In various embodiments, the techniques disclosed herein may be used to ensure that applications intended to communicate with each other via the secure connection bus are active. The techniques may also be used to allow each application to authenticate the other(s), to protect against interception of communication(s), to protect against man-in-the-middle attacks, and/or to ensure the integrity of communication.

FIG. 1 is a block diagram illustrating an embodiment of a system including a secure application-to-application connection bus. In the example shown, a mobile device 100 (e.g., smartphone, tablet, etc.) includes a management agent 102 (e.g., a mobile device management (MDM) agent, a trusted management agent, trust client app), managed application(s) 104 (e.g., managed client application(s)), non-managed application(s) 106 (e.g., non-authorized application(s), untrusted application(s)), and/or other applications. The management agent 102, managed applications 104, and/or other components may be components of an MDM system. The management agent 102, managed applications 104, and/or other components are configured to share information/data in a trusted manner via a secure mobile application connection bus 108 (e.g., secure inter-application connection bus, secure application command bus, secure application communication bus, etc.). For example, information may be shared in a trusted manner among applications authorized to access the secure connection bus 108.

In some embodiments, a library 110 (e.g., a library compiled into the application, injected into the application, added to the application by wrapping) may be associated with a managed application 104. The library 110 may modify an application's code to behave differently than the corresponding unmodified version of the application behaves. For example, the library 110 may reconfigure a managed application 104 to allow the management agent 102 to perform actions on behalf of the managed application including invoking mobile operating system components, using mobile device resources, and accessing/storing application data. The library 110 may mediate communication between a managed application 104 and the management agent 102 and/or other managed application(s) 104. The library 110 may, in some embodiments, apply configuration changes, enforce policies, execute actions, and/or perform other operations within the managed application 104.

According to various embodiments, the management agent 102, managed applications 104, and/or other elements are configured to transfer data in a trusted manner (e.g., securely) via the secure mobile application connection bus 108. In some embodiments, data may be transferred in a trusted manner among applications authorized to have access to the secure mobile application connection bus 108 by storing the data in an encrypted form in a shared storage location (e.g., a paste board, shared keychain location, and/or other storage), which is accessible to the entities authorized to communicate via the bus 108. In various embodiments, data may be transferred in a trusted manner from a first application (e.g., the management agent 102) to a second application (e.g., a managed application 104) authorized to have access to the secure mobile application connection bus 108 by calling a uniform resource locator (URL) scheme associated with the second application including the encrypted data. Techniques for securely transferring data between applications using a secure mobile connection bus 108 are discussed in detail below.

According to various embodiments, communications between the mobile device 100 and enterprise backend server(s) 112 (e.g., enterprise servers, file server, email server, application servers, etc.), enterprise content 114 (e.g., files, enterprise data), network resources, and/or other components may pass through a security enforcement node 116 (e.g., a reverse proxy server, sentry). In various embodiments, the security enforcement node 116 is a reverse proxy for synchronization, data transfer, and/or other traffic between managed applications 104 and enterprise servers such as the backend server 112. While processing (e.g., managing) the traffic (e.g., securely transferred data), the security enforcement node 116 may optimize traffic (e.g. compress) as well as add, modify, and/or remove content based on one or more policies from security management platform 112 (e.g., add emergency alert to web request).

In various embodiments, a security management platform 118 (e.g., a virtual smartphone platform, security management server, etc.) manages configuration(s), polic(ies), and/or settings associated with the mobile device 100. The security management platform 118 may manage (e.g., control, dictate, determine) the configurations, policies, settings, and/or other functional aspects of one or more of the managed applications 104 on the mobile device 100. For example, the security management platform 118 may communicate with managed applications 104 using the management agent 102 as intermediary. Configuration changes, policy updates, setting changes, and/or commands for the managed applications 104 may be pushed to the management agent 102 for secure distribution to the applications 104. In some embodiments, the management agent 102 may, for example, connect to the security management platform 118 (e.g., on a periodic basis) to update the device 100 status, retrieve policy information, retrieve configuration information, and/or perform other operations. The management agent 102 may securely transfer information between the security management platform 118 and the managed applications 104 via the secure mobile application connection bus 108.

In various embodiments, the library 110 may use a security token (e.g., certificate(s), application identification, authentication state, etc.) received from (e.g., pushed from) the security management platform 118. The security enforcement node 116 may analyze (e.g., evaluate) a security token with (e.g., against) the policy on security management platform 118 to determine whether to allow, restrict (e.g., partially allow), and/or deny access to an enterprise server 112. In various embodiments, the library 110 can provide a security token to a $3^{rd}$ party server to use in authentication operations. The $3^{rd}$ party server(s) can, for example, validate the security token to the security management platform 118.

Figure 2:
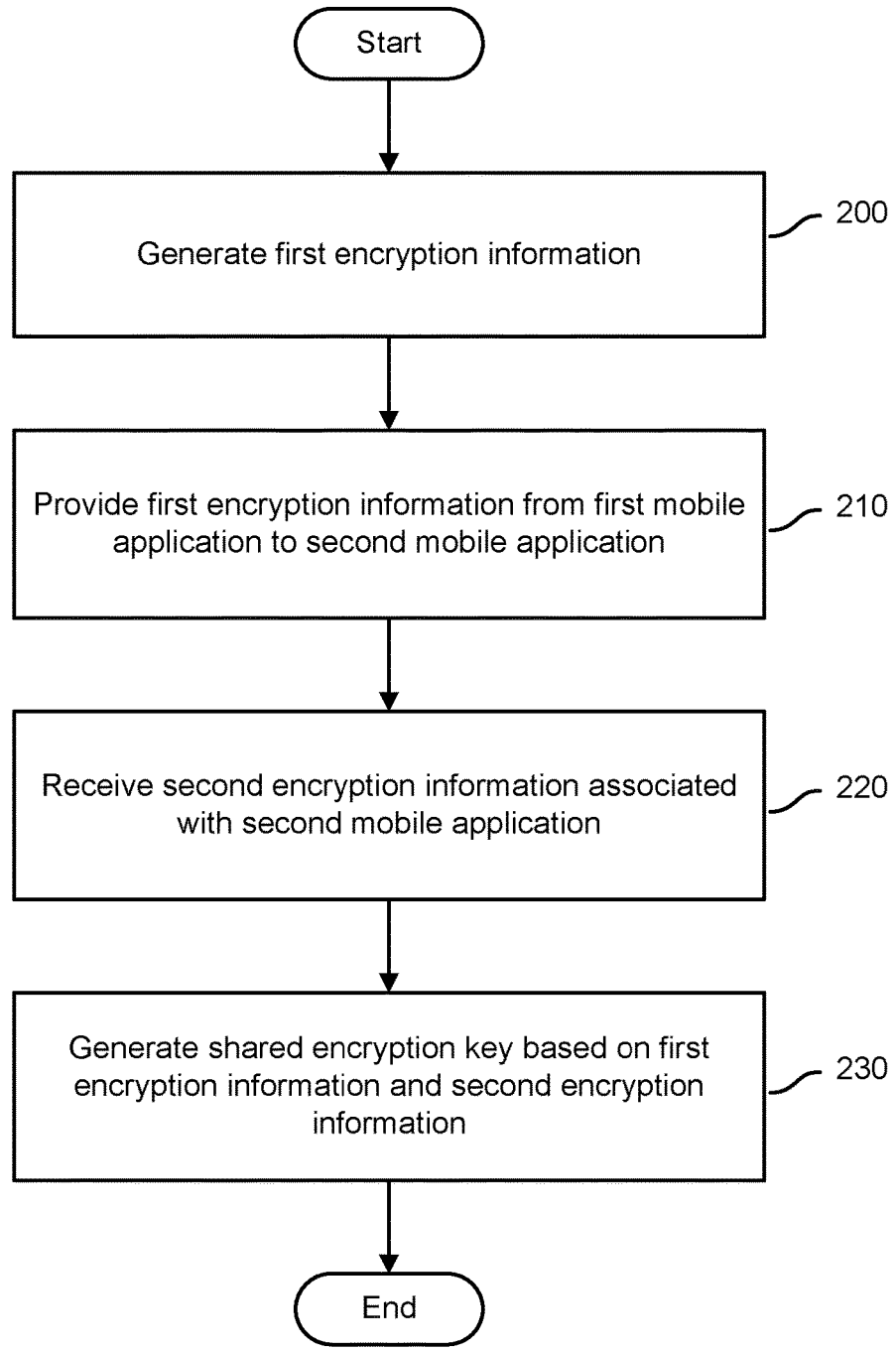
FIG. 2 is a flowchart illustrating embodiments of a process of encryption information exchange.

FIG. 2 is a flowchart illustrating embodiments of a process of encryption information exchange. In various embodiments, the process is performed by the system 100 of FIG. 1. At 200, first encryption information may be generated. In some embodiments, a first encryption information may include encryption-handshake information generated by the first application (e.g., an initiating application, a management agent, managed application). The first encryption information may include, for example, a random number, a public key associated with private-public key pair (e.g., used in a Diffie-Hellman, elliptic curve Diffie-Hellman, and/or other key exchange approach), and/or any other type of encryption-related information.

At 210, first encryption information is provided from a first mobile application to a second mobile application. According to some embodiments, first encryption information and/or other information may be provided from the first application to the second application via a uniform resource locator (URL) scheme-based approach. In some embodiments, the first mobile application, second mobile application, and/or other mobile applications on the device may register for a URL scheme (e.g., a custom URL scheme) with, for example, the mobile device operating system. In some embodiments, a URL associated with an application may include a canonical URL scheme (e.g., a URL scheme defined by and/or in association with an MDM framework). In various embodiments, a URL scheme for an application may be generated (e.g., constructed) by prefixing, suffixing, and/or otherwise altering a bundle identifier (bundle ID) associated with the application (e.g., ACcom.company. app:).

According to some embodiments, a URL scheme associated with a second mobile application may be determined by a first mobile application. In some embodiments, the URL scheme associated with the second mobile application may be determined by querying an operating system (e.g., iOS, Android, etc.) associated with the mobile device. An operating system associated with the mobile device may include, for example, a registry of URL schemes and associated applications.

In various embodiments, the second mobile application on a device may, for example, register a URL scheme (e.g., ACcom.company.secondapp:) with the operating system. The first mobile application may also be associated with a URL scheme (e.g., ACcom.company.firstapp:, ACcom.company.MDMagent:, etc.). In some embodiments, the first mobile application may retrieve the URL scheme associated with the second mobile application from the operating system (e.g., URL scheme registry/database).

In some embodiments, a URL call associated with (e.g., directed to) the second application may be used to transfer data from the first application to the second application. The first mobile application (e.g., management agent) may generate a URL that starts with a URL scheme associated with the second application (e.g., ACcom.company.secondapp:) and includes the first encryption information encoded in a form suitable for inclusion in a URL (e.g., a base64 encoded version first application key). In various embodiments, the first mobile application may call the operating system to open a URL (e.g., ACcom.company.secondapp://first_app_key).

According to various embodiments, an operating system (e.g., iOS) may locate an installed application that has registered for the second application's custom URL scheme (e.g., ACcom.company.secondapp:). In the event the second application is not running (e.g., is inactive, in the background, etc.), the operating system may launch the second application. In various embodiments, the second application may be notified (e.g., by the operating system) of the request to open the URL from the first mobile application. In various embodiments, the operating system may provide the URL and an identifier (e.g., bundle ID) of the first application (e.g., the application that originated the URL call) to the second application.

In various embodiments, an operating system may not prevent multiple applications from registering for the same custom URL scheme, so in certain cases, the second mobile application may not receive the open URL request (e.g., from the operating system).

According to some embodiments, at least one credential associated with the first application may be provided to the second application (e.g., in addition to the first encryption information) in the URL call body (e.g., payload). For example, the at least one credential associated with the first application may include an application identifier (e.g., bundle ID) and/or other information associated with the first application. The application identifier (e.g., bundle ID) associated with the first application may be used by the second application to validate/verify an identity of the first application. For example, the application identifier included in the body of the URL may be compared to an application identifier provided by the operating system in conjunction with the URL.

In various embodiments, a credential associated with the second application may include a signature of an identifier (e.g., bundle ID) associated with the second application. For example, the first mobile application may include a public-private key pair (e.g., added during development of the application) for use in, for example, an asymmetric key encryption algorithm. The private key may be used to generate a signature of the first mobile application identifier (e.g., bundle ID). The public key may be packaged in the first and second mobile applications. The first mobile application may provide the signature of its application identifier (e.g., bundle ID) in the URL to the second application (e.g., in an appropriately encoded form).

In various embodiments, the second application may receive the URL request from the operating system, verify the sender of the URL, process (e.g., parse) the URL, and take the content (e.g., "first_encryption_information") for its use. For example, in the case in which the first mobile application provided a signature of first mobile application identifier (e.g., bundle ID), the second mobile application may verify that the signature is a valid signature of the first mobile application identifier (e.g., bundle ID) by, for example, decrypting the signature using the second mobile application public key. If the signature is not valid, the request may be discarded. Additional details regarding aspects of the process from the perspective of the second mobile application are disclosed below.

At 220, second encryption information associated with the second application may be received. In various embodiments, second encryption information may be generated by the second application, sent to the first application, and received at the first application. In some embodiments, the second encryption information may include encryption information associated with the second mobile application. The second encryption information may include encryption handshake information generated by the second mobile application. For example, the second encryption information may include a random number, a public key associated with private-public key pair, and/or any other type of encryption-related information generated by the second application.

In various embodiments, the second encryption information may be provided from the second application to the first application using a URL call. The process of generating and/or executing the URL call by the second application may be similar to the process used by the first application as discussed above. In some embodiments, the URL from the second application including the second encryption information may be received at the first application.

According to some embodiments, the first application, upon receiving a request to open the URL from the second application, may verify an identity of the source of the URL. For example, the URL from the second application may be associated with an identifier (e.g., bundle ID) for the second application. The first application may, for example, determine that the application identifier associated with the URL call matches an identifier (e.g., included in a list of identifiers) of an application with which the second application is authorized, willing to, and/or permitted to communicate. Upon verification, the first application may decode the URL and/or extract the second encryption information included therein.

At 230, a shared encryption key may be generated based at least in part on the first encryption information and second encryption information. In some embodiments, the shared encryption key may include a combined key generated, for example, by combining the first encryption information (e.g., a first key), the second encryption information (e.g., a second key), and/or possibly other information. In some embodiments, the first encryption information and second encryption information may be combined using a binary XOR approach and/or similar approach to generate the shared encryption key. In various embodiments, the first encryption information and second encryption information may be combined using any approach that preserves an entropy of the first and second encryption information.

In various embodiments, the shared encryption key, first encryption information, second encryption information, and/or other information may be keys exchanged using a Diffie-Hellman key exchange, elliptic curve Diffie-Hellman key exchange, and/or any other key exchange approaches. For example, the first encryption information may include a public key included in a private-public key pair associated with a first application, and the second encryption information may include a public key associated a private-public key pair associated with the second application. The private-public key pairs may include private-public keys used in a Diffie-Hellman, elliptic curve Diffie-Hellman, and/or other key exchange approach. The first encryption information (e.g., a public key generated by the first application) and second encryption information (e.g., a public key generated by the second application) may be exchanged and used to generate a shared encryption key (e.g., a shared secret) as part of a Diffie-Hellman, elliptic curve Diffie-Hellman, and/or other key exchange approach.

In some embodiments, the first encryption information, second encryption information, shared encryption key, and/or other encryption-related information may be stored in a secure storage location (e.g., a keychain data storage, pasteboard, etc.) for use in later operations. For example, encryption information including private keys, public keys, and/or private-public key pairs may be stored in a secure storage location. The private keys, public keys, and/or private-public key pairs may, for example, include keys generated during and/or used in a Diffie-Hellman key exchange, elliptic curve Diffie-Hellman key exchange, and/or any other key exchange operation.

Figure 3:
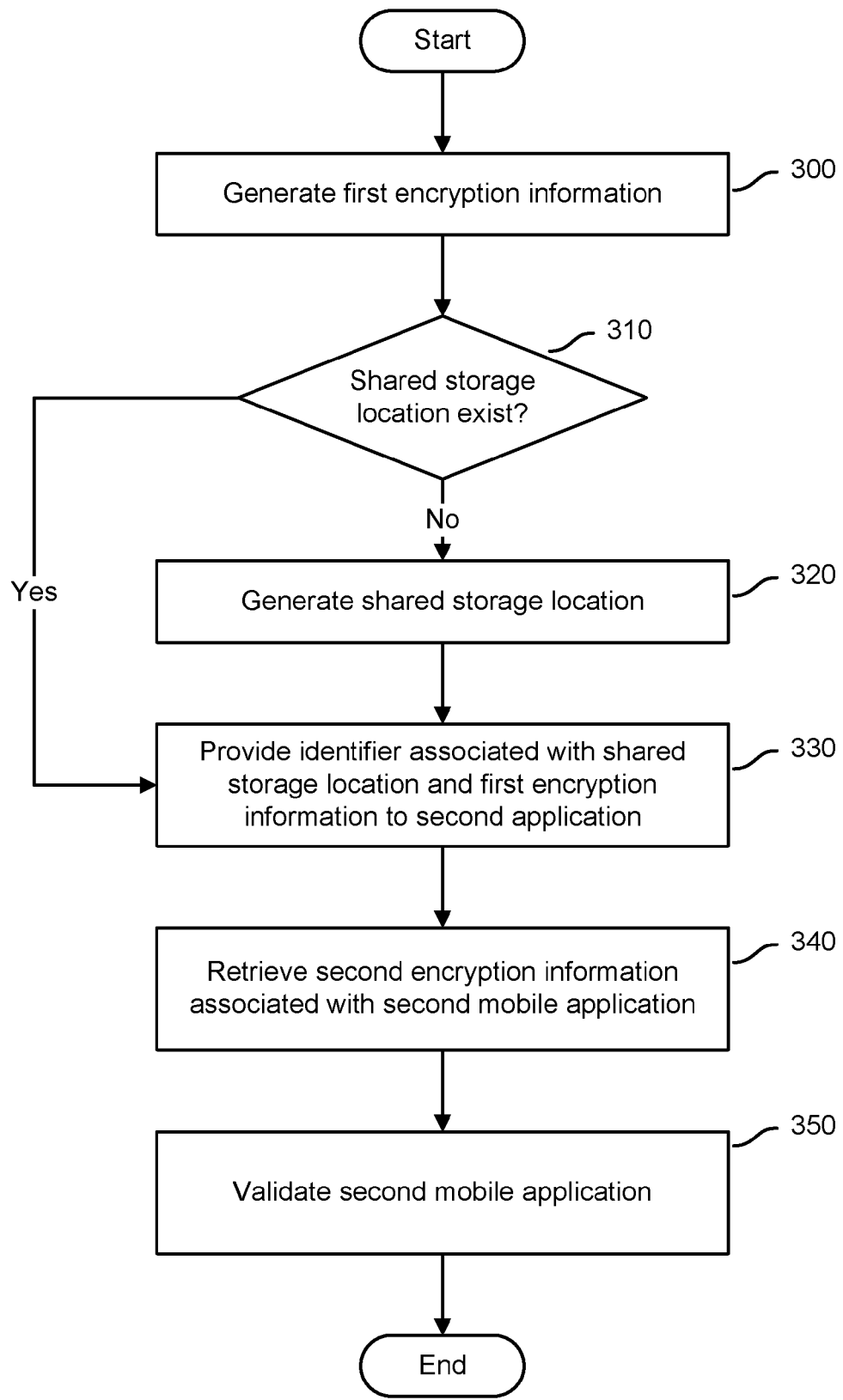
FIG. 3 is a flowchart illustrating embodiments of a process of encryption information exchange.

FIG. 3 is a flowchart illustrating embodiments of a process of encryption information exchange. In various embodiments, the process is performed by the system 100 of FIG. 1. The process of FIG. 3 illustrates embodiments of a process for generating a secure application connection bus from the perspective of a first mobile application (e.g., a management agent on a mobile device). At 300, first encryption information may be generated (e.g., by the first application, a security management server). In some embodiments, the first encryption information may include encryption handshake-associated information generated by the first mobile application (e.g., a management agent on the mobile device).

In various embodiments, the first encryption information may include encryption handshake-associated information generated by a security management platform (e.g., MDM server) that manages one or more applications on the mobile device (e.g., via a management agent on the device). For example, the first encryption information may include a public key associated with private-public key pair generated at the security management platform. In this example, the first application (e.g., management application) may act as an intermediary to deploy the first encryption information to a second mobile application (e.g., a destination managed application). In this case, information transferred from the security management platform to the second mobile application (e.g., managed application) via the first mobile application (e.g., management agent) may not be decrypted by the first mobile application (e.g., management agent).

At 310, it may be determined (e.g., by the first mobile application) whether a shared storage location exists on the device for transfer of data between the first mobile application and a second mobile application. Example shared storage locations suitable for secure transfer of information between applications include a pasteboard (e.g., an application-specific pasteboard, general pasteboard), shared keychain, shared storage location associated with a native MDM framework (e.g., the iOS MDM framework), and/or other shared storage locations. In some embodiments, a system pasteboard (e.g., general pasteboard) associated with the mobile device (e.g., native to the mobile device) may be used. A system pasteboard may, however, be less secure than an application-specific pasteboard, and it may be determined that an application-specific pasteboard should be generated.

In various embodiments, a shared keychain (e.g., certificate) storage location may be identified (e.g., by the first mobile application). An operating system associated with a device may, for example, provide a certificate storage location for one or more applications. In some embodiments, the certificate storage location may be used to transfer data between applications (e.g., may be used as a shared storage location).

In the event a shared storage location exists on the device (e.g., was previously generated), the process may proceed to step 330. In the event a shared storage location does not exist on the device, the process may proceed to step 320.

At 320, a shared storage location may be generated. In various embodiments, the first mobile application (e.g., a management agent) may generate a shared storage location on the device. In some embodiments, the first mobile application (e.g., a management agent) may generate a pasteboard (e.g., an application-specific pasteboard) to share information with the second mobile application. By way of example, a mobile device (e.g., native operating system) may include one or more pasteboards including, for example, system-wide pasteboards (e.g., a general pasteboard (e.g., a pasteboard for copy-paste operations involving any type of data), a find pasteboard (e.g., a pasteboard used in search operations)), application-specific pasteboards (e.g., a pasteboard generated by application(s)), and/or other types of pasteboards. For example, one application may provide information to a pasteboard for retrieval by another application. In various embodiments, the first application may generate an application-specific pasteboard by invoking/calling a pasteboard generation class method associated with the operating system of a mobile device. The application-specific pasteboard may be generated and a pasteboard identifier (e.g., a pasteboard object, a unique identifier) may be returned to the first mobile application. In some embodiments, it may be specified (e.g., by the first mobile application) whether the pasteboard is persistent (e.g., remains in existence after the application is closed/quits). The pasteboard example discussed above is of course one example shared storage location, and other types of shared storage locations may be generated.

At 330, first encryption information and an identifier associated with the shared storage location may be provided to the second application. In various embodiments, the first encryption information, identifier associated with a shared storage location, and/or other information may be provided from the first application to the second application using a URL scheme associated with the second mobile application.

In some embodiments, a first application may query the operating system associated with the mobile device to determine/identify/retrieve a URL scheme associated with the second mobile application.

In some embodiments, the first encryption information, identifier associated with a shared storage location, and/or other information may be provided to a general pasteboard associated with the mobile device. And, the second application may be configured to retrieve the information from the general pasteboard.

In some embodiments, the first encryption information, identifier associated with a shared storage location, and/or other information may be provided to the second mobile application using any of a variety of approaches. In various embodiments, an approach for exchanging encryption information between a first application (e.g., a management agent) and a second application (e.g., a managed application) may be governed by a security management platform (e.g., a security management server) external to the mobile device, the management agent, and/or other node. In one case, the determined encryption information transfer (e.g., key exchange) approach may be pushed from the security management platform to the management agent for implementation on the mobile device. For example, the security management platform may require the first and second mobile applications to exchange encryption information (e.g., first and second encryption information) using a URL-based approach, pasteboards, shared keychain associated with the device, and/or other approach(es).

At 340, second encryption information associated with the second mobile application may be retrieved from the shared storage location. In various embodiments, the second encryption information may include encryption handshake-associated information generated by the second mobile application (e.g., a managed application on the mobile device), credentials associated with the second mobile application, and/or other information.

According to some embodiments, the second encryption information may include one or more credentials associated with the second mobile application. Credentials associated with the second mobile application may include, for example, an application identifier, bundle identifier (e.g., bundle ID), and/or other credential information associated with the application. In various embodiments, a signature of an identifier (e.g., encrypted by the second application) may be included in and/or along with the second encryption information.

At 350, the second mobile application may be validated. In some embodiments, the first mobile application (e.g., a management agent) may validate the identity (e.g., credentials) of the second mobile application (e.g., a managed application) with a security management server (e.g., security management platform). For example, the first mobile application may retrieve from the shared storage location credential information associated with the second mobile application. The credential information may be passed from the first mobile application to the security management platform. The security management platform may validate the identity of the second mobile application by comparing the credentials associated with second application to one or more stored sets of credentials for the mobile device (e.g., applications on the mobile device).

In some embodiments, the credentials of the second mobile device may be validated by the first mobile application (e.g., a management agent). For example, the first mobile application may compare the second mobile application credentials (e.g., retrieved from a shared storage location) to a list of managed applications accessible to the first mobile application (e.g., management agent). The first mobile application may also verify the credentials of the second mobile application using an application identifier (e.g., bundle ID) signature-based approach as discussed herein.

Figure 4:
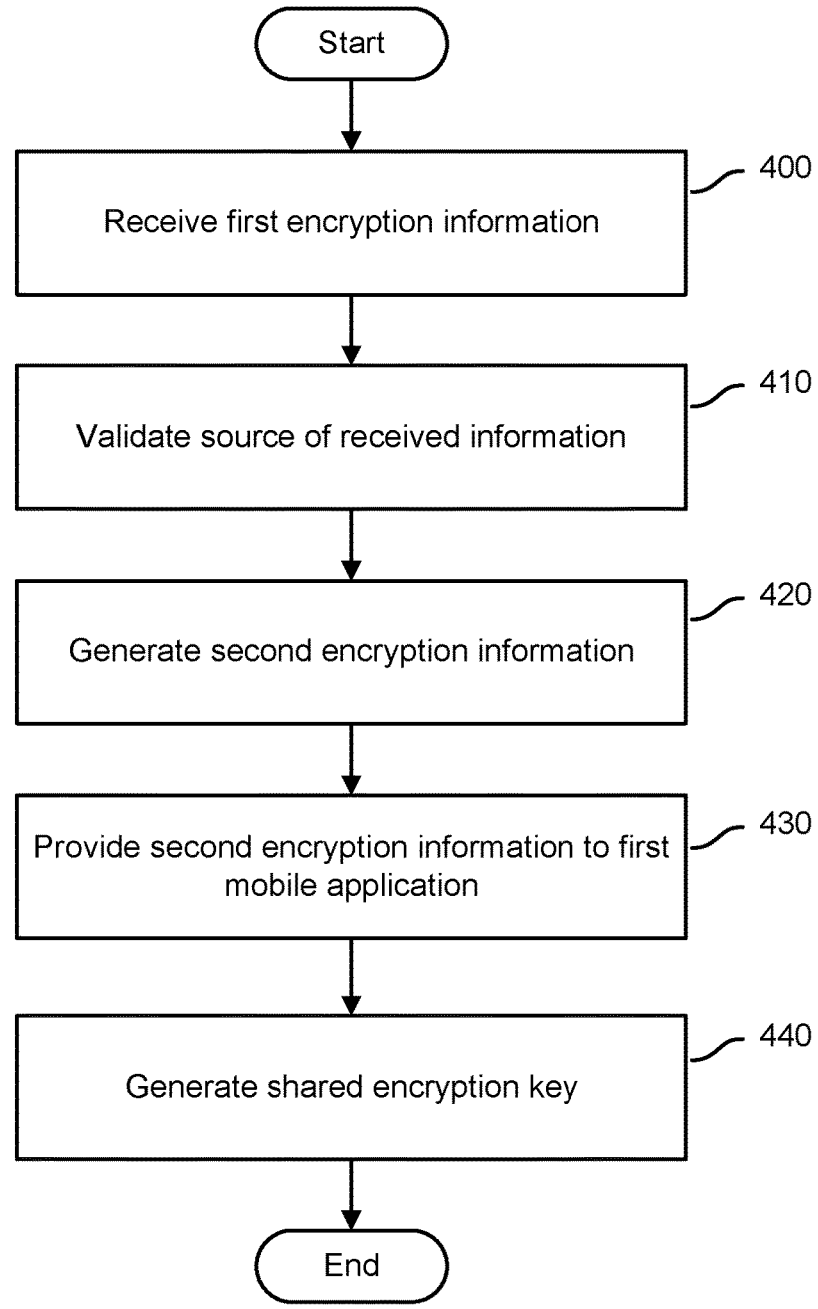
FIG. 4 is a flowchart illustrating embodiments of a process of secure communication between mobile applications.

FIG. 4 is a flowchart illustrating embodiments of a process of secure communication between mobile applications. In various embodiments, the process is performed by the system 100 of FIG. 1. The process of FIG. 4 describes embodiments of a process for generating a secure application connection bus from the perspective of a second mobile application (e.g., a managed application on a mobile device).

At 400, first encryption information may be received. In some embodiments, a second application (e.g., managed application) may receive first encryption information associated with a first application (e.g., a management agent). The first encryption information may include, for example, a random number, a public key associated with the first mobile application (e.g., a first public key), and/or other encryption-related information.

In some embodiments, an identifier associated with a shared storage location may be received at the second mobile application (e.g., along with first encryption information). For example, the first mobile application may have generated a shared storage location (e.g., a named pasteboard) for communications between the first and second mobile applications. The first mobile application may provide an identifier associated with the shared storage location to the second mobile application along with the first encryption information.

In various embodiments, the first encryption information, identifier associated with a shared storage location, and/or other information may be received at the second application (e.g., from the first application) in a URL, via a shared data storage location (e.g., a pasteboard), and/or using other techniques, as discussed in detail above.

At 410, a source of the received information (e.g., the first encryption information, identifier associated with the shared storage location, etc.) may be validated. In some embodiments, a library (e.g., a library compiled into the application, injected into the application, added to the application by wrapping, an SDK) may be associated with the second application (e.g., a managed application). The library may be associated with an MDM framework (e.g., managed application architecture) of which the second application is a member. In some embodiments, the library may include a list of trusted applications. And, an identifier associated with the first mobile application from which the information was received may be compared to the list for validation. In the event an identifier associated with the first mobile application (e.g., the management agent) is validated by the library, the secure connection bus generation process will proceed. In the event the identifier associated with the first mobile application is not validated (e.g., by the library), the process may be terminated.

According to some embodiments, the first encryption information, identifier associated with a shared storage location, and/or other information may be provided to the second application (e.g., from the first application) using a URL call associated with the second mobile application. The URL may be processed (e.g., parsed) to extract the first encryption information (e.g., first application public key), shared storage location identifier, and/or other information. In various embodiments, the URL call may include information identifying the source of the URL call (e.g., the first mobile application). The source identifying information may be extracted and used to validate the first mobile application (e.g., by the library) using the techniques discussed above.

In various embodiments, the first mobile application may have provided a signature of a first mobile application identifier to the second application. The first and second mobile applications may, for example, include private-public key pairs for asymmetric key encryption. And the second mobile application may use its public key to decrypt the signature of the identifier (e.g., bundle ID) associated with the first application. The second mobile application may then determine whether the decrypted identifier is a valid identifier (e.g., bundle ID) associated with the first mobile application. For example, the second application, a library associated with the second application, and/or other node may compare the decrypted identifier (e.g., bundle ID) to the identifier associated with the URL. In the event the two identifiers match, it may be determined that the source of the URL call (e.g., the first application) is valid.

At 420, a second encryption information may be generated. In some embodiments, the second encryption information may include encryption handshake information generated by the second mobile application (e.g., a managed application on the mobile device). For example, the second encryption information may include a random number, a public key associated with a private-public key pair, and/or any other type of encryption-related information.

In some embodiments, the second encryption information may include at least one credential associated with the second application, and/or other information. For example, the at least one credential associated with the second application may include an application identifier (e.g., bundle ID) and/or other information associated with the second application. In various embodiments, a credential associated with the second mobile application may include a signature of an identifier (e.g., an encrypted version of the bundle ID) associated with the second application.

At 430, the second encryption information may be provided to the first application. In various embodiments, the second encryption information may be provided to the first application using a URL-scheme based approach as discussed above. In some embodiments, the second encryption information may be provided to the first application using shared storage location (e.g., pasteboard, shared keychain, and/or other shared storage location).

According to some embodiments, the second mobile application may provide the second encryption information to the first mobile application using a URL call and in addition provide a message (e.g., indicating the second encryption information has been sent via URL) to the shared storage location (e.g., pasteboard). Simultaneously (e.g., substantially simultaneously) providing a URL call and a message to a shared storage location associated with the first application may, for example, result in a faster response to a request from the first mobile application.

At 440, a shared encryption key may be generated based at least in part on the first encryption information and second encryption information. In various embodiments, the combined key generation process at the second mobile application may be similar to the process of generating the combined key at the first application. In some embodiments, the combined key may be generated, for example, by combining the first encryption information (e.g., a first key), the second encryption information (e.g., a second key), and/or possibly other information. In some embodiments, the first encryption information and second encryption information may be combined using a binary XOR approach and/or similar approach to generate the shared encryption key.

Figure 5:
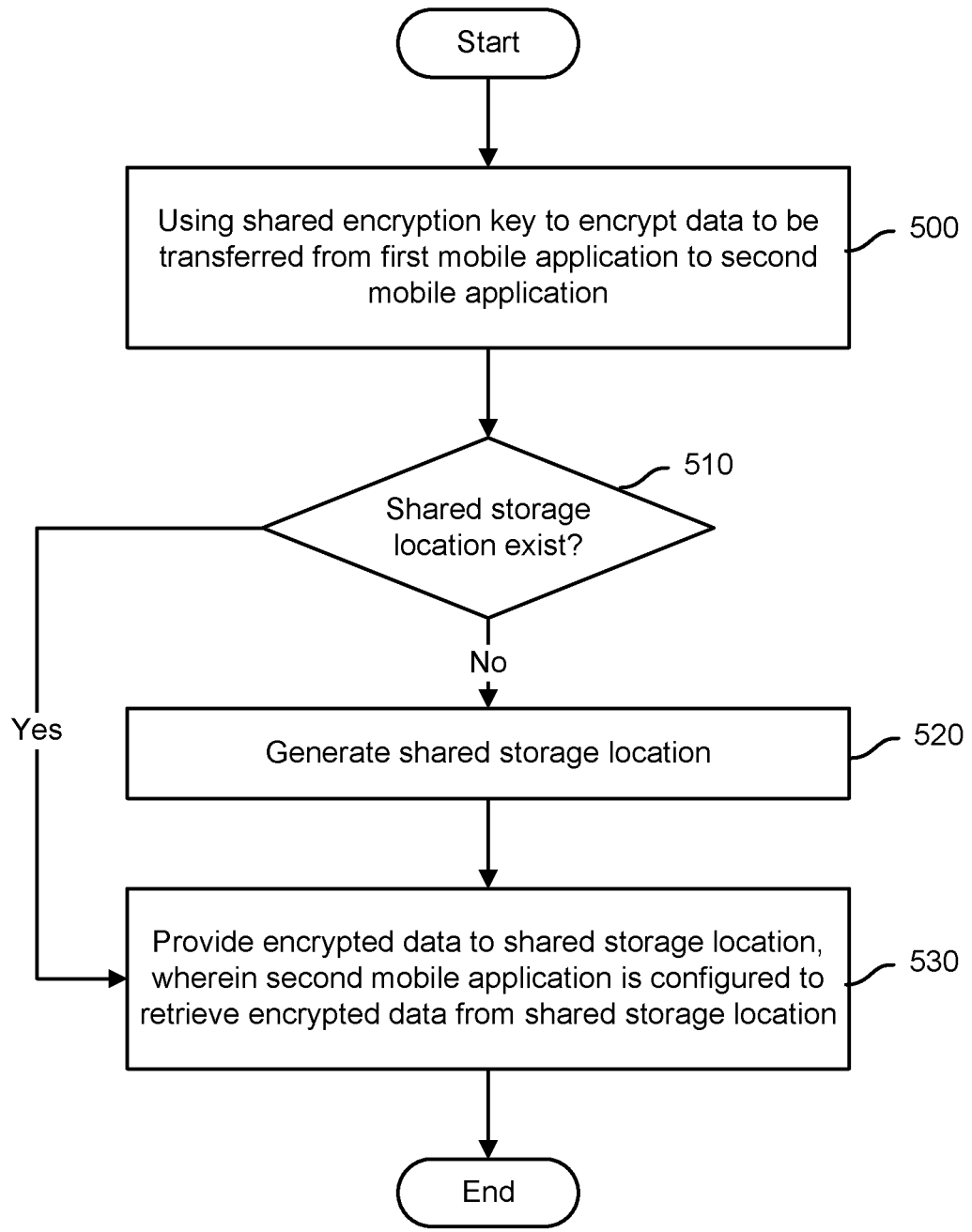
FIG. 5 is a flowchart illustrating embodiments of a process of secure application to application communication.

FIG. 5 is a flowchart illustrating embodiments of a process of secure application to application communication. In various embodiments, the process is performed by the system 100 of FIG. 1. At 500, a shared encryption key may be used to encrypt data to be transferred from a first mobile application to a second mobile application. In some embodiments, the shared encryption key may be used as an encryption key for a symmetric key encryption approach (e.g., Advance Encryption Standard 256 (AES256) encryption). The shared encryption key may be used to encrypt any data to be transferred from the first mobile application to the second mobile application.

At 510, it may be determined (e.g., by the first mobile application) whether a suitable shared storage location exists on the device for transfer of data between the first mobile application and the second mobile application. As discussed above, example shared storage locations suitable for secure transfer of information between applications include a pasteboard (e.g., an application-specific pasteboard), shared keychain, shared storage location associated with a native MDM framework (e.g., the iOS MDM framework), a system pasteboard (e.g., clipboard) and/or other shared storage locations. In the event a shared storage location exists on the device (e.g., was previously generated), the process may proceed to step 530. In the event a shared storage location does not exist on the device, the process may proceed to step 520.

At 520, a shared storage location may be generated. In various embodiments, the first mobile application (e.g., a management agent), second mobile application, and/or any other node may generate a shared storage location on the device. In some embodiments, the first mobile application (e.g., a management agent) may generate a pasteboard (e.g., an application-specific pasteboard) to share information with the second mobile application. In various embodiments, the first application may generate an application-specific pasteboard by invoking/calling a pasteboard generation class method associated with the operating system of a mobile device. The application-specific pasteboard may be generated and a pasteboard identifier (e.g., a pasteboard object, a unique identifier) may be returned to the first mobile application. In various embodiments, the second application may generate the shared storage location (e.g., named pasteboard).

According to various embodiments, an identifier associated with a shared storage location may be defined by the first mobile application, second mobile application, and/or other node. For example, the first mobile application may generate an identifier for the shared storage location. In certain cases, this identifier may be a name, string, random set of characters, and/or any other information. In some embodiments, the identifier may be encrypted using the shared encryption key, and the encrypted version of the identifier may be passed to the second application using a URL scheme-based approach. Using this approach, the identifier associated with shared storage location may be obfuscated (e.g., protected from discovery by unauthorized nodes on the device).

At 530, the encrypted data may be provided to a shared storage location. The second mobile application may, for example, be configured to retrieve the encrypted data from the shared storage location. In various embodiments, data is transferred securely between the first application and the second mobile application via the shared storage location (e.g., pasteboard). In various embodiments, the encrypted data may be provided from the mobile application to the shared storage (e.g., pasteboard, secure keychain storage location, a storage location associated with an MDM framework native to the device) location as cyphertext. The second application may retrieve the cyphertext (e.g., the encrypted data) from the shared storage location and decrypt the encrypted data using the shared encryption key. Other applications (e.g., non-managed applications) may, in certain cases, be able to see the encrypted content, but will not have the shared encryption key necessary to decrypt the cyphertext.

In various embodiments, the second application may use a similar to process to encrypt data and provide the encrypted data to the shared storage location for retrieval by the first application. Using these techniques (e.g., a secure application connection bus), data may be securely transferred between the first mobile application and second mobile application.

Figure 6:
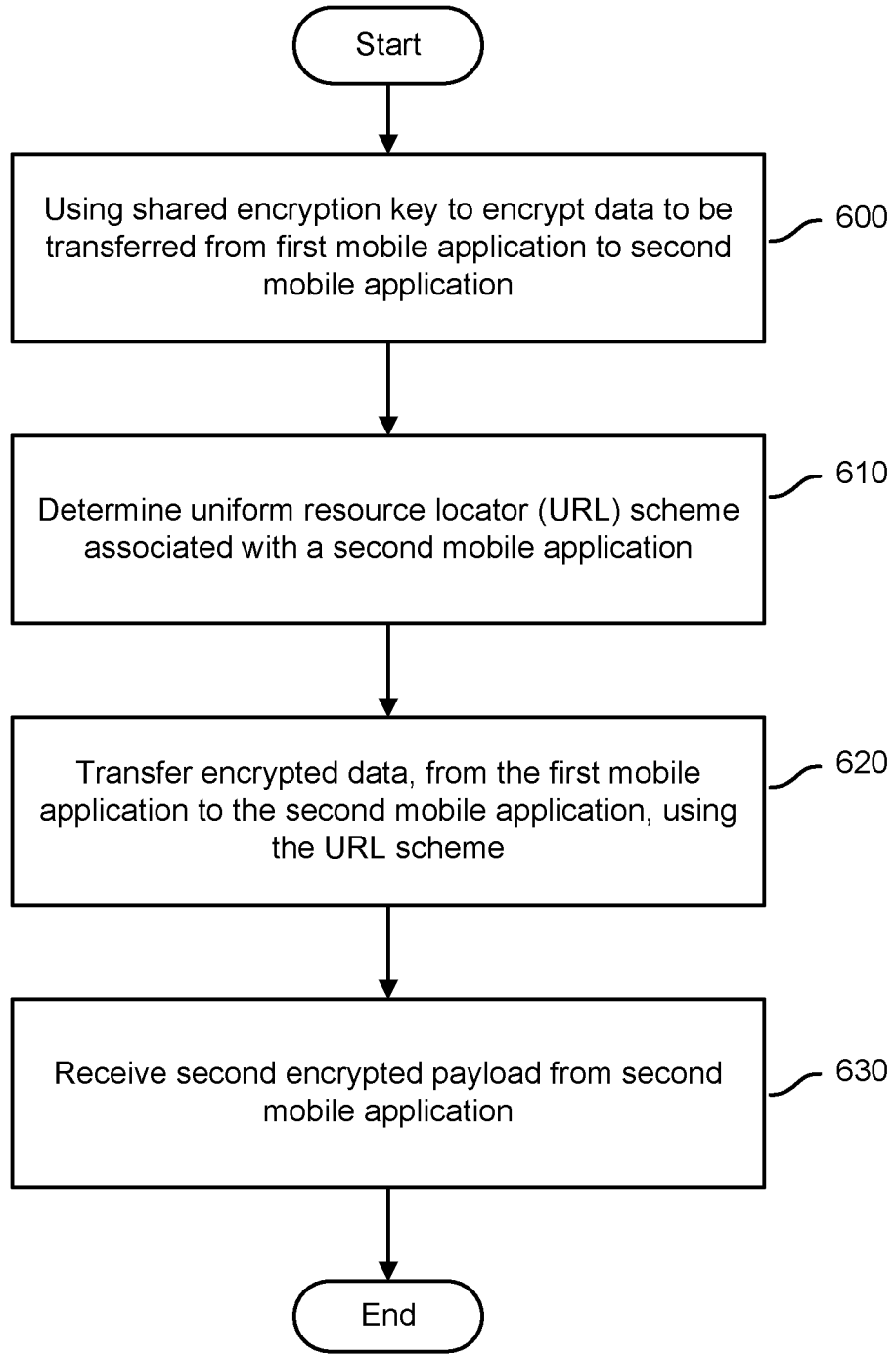
FIG. 6 is a flowchart illustrating embodiments of a process of secure communication between mobile applications.

FIG. 6 is a flowchart illustrating embodiments of a process of secure communication between mobile applications. In various embodiments, the process is performed by the system 100 of FIG. 1. At 600, a shared encryption key may be used to encrypt data to be transferred from a first mobile application to a second mobile application. In some embodiments, data to be transferred from a first application to a second application may be encrypted using the shared encryption key in conjunction with any encryption approach (e.g., the encryption approaches discussed herein).

At 610, a URL scheme associated with a second mobile application may be determined by a first mobile application. In some embodiments, the URL scheme associated with the second mobile application may be determined by querying an operating system (e.g., iOS, Android, etc.) associated with the mobile device. In some embodiments, the first mobile application may retrieve the URL scheme associated with the second mobile application from the operating system (e.g., URL scheme registry/database). In certain cases, the first application may already have an awareness of the URL scheme associated with the second application from the key exchange process. This step may therefore be optional.

At 620, the encrypted data may be transferred from the first mobile application to the second mobile application using the URL scheme. In various embodiments, a URL call may be executed based at least in part on the URL scheme associated with the second mobile application. In some embodiments, an encrypted data may be included in a URL call generated and/or executed by the first mobile application. For example, an encrypted payload (e.g., "12345") may be included in the URL call (e.g., ACcom.company.secondapp://12345). The second application may receive the URL call and parse the URL to extract the encrypted payload (e.g., "12345"). The encrypted payload may be decrypted using the previously generated shared encryption key.

In some embodiments, the second mobile application is configured to validate at least one credential associated with the first application based at least in part on the URL scheme. For example, the URL call may include information identifying the source of the URL call (e.g., the first mobile application) as discussed herein.

At 630, an encrypted payload may be received from the second mobile application. In some embodiments, an encrypted payload may be generated at the second mobile application (e.g., a managed mobile application) and transferred to the first mobile application (e.g., a management agent) using a URL scheme associated with the first mobile application.

Figure 7:
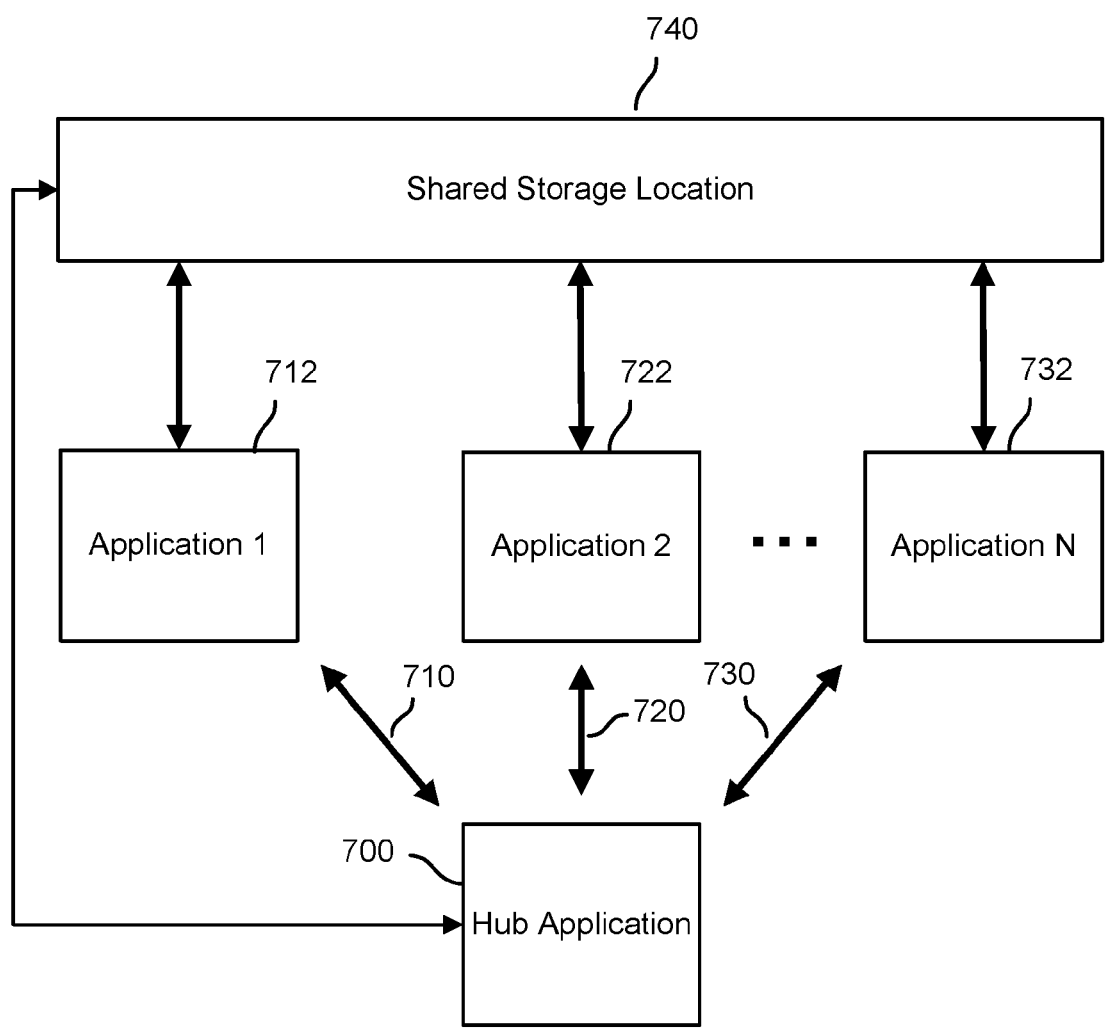
FIG. 7 is a block diagram illustrating embodiments of secure application to application communication among multiple applications.

FIG. 7 is a block diagram illustrating embodiments of secure application to application communication among multiple applications. In some embodiments, a hub application 700 (e.g., management agent, managed application) may establish secure connection buses 710, 720, 730 with multiple applications 712, 722, 732 using the techniques discussed herein. For example, a secure connection bus 710 may be established between the hub application 700 and a first application 712 using the URL scheme-based encryption information exchange. Similarly, a secure connection bus 720 may also be established between the hub application 700 and a second application 722 using the URL scheme-based encryption information exchange approaches. Further, secure connection buses may also be established between the hub application 700 and an any number of applications (e.g., an Nth application 732) using the URL scheme-based encryption information exchange approaches.

In some embodiments, data may be received at the hub application 700 for secure dispersal to other applications. In certain cases, the data may be received from a security management platform, management agent, managed application, and/or other node. The data may, for example, be intended for distribution to multiple applications (e.g., a first application 712, second application 722, Nth application 732, etc.). The hub application 700 may, for example, distribute the data (e.g., repeat the data) to the multiple applications, for example, via the secure connection bus(es) 710, 720, 730 associated with each application In various embodiments, the hub application 700 may generate a shared storage location 740 from which multiple applications (e.g., a first application 712, second application 722, Nth application 732, etc.) can retrieve and provide data. In some embodiments, the hub application 700 may generate an identifier for the shared storage location 740 (e.g., a random pasteboard name), and a random number as a shared encryption key (e.g., for a symmetric key algorithm). The hub application 700 may use the secure connection bus 710, 720, 730 to send the applications 712, 722, 732 the identifier (e.g., random name) of the shared storage location 740 (e.g., pasteboard) and/or the shared encryption key (e.g., associated with the secure storage location). The applications 712, 722, 732 may then read from, write to, and/or otherwise operate in conjunction with a shared storage (e.g., pasteboard) that has the random name, encrypting and decrypting payloads using the shared encryption key (e.g., the random number).

Figure 8:
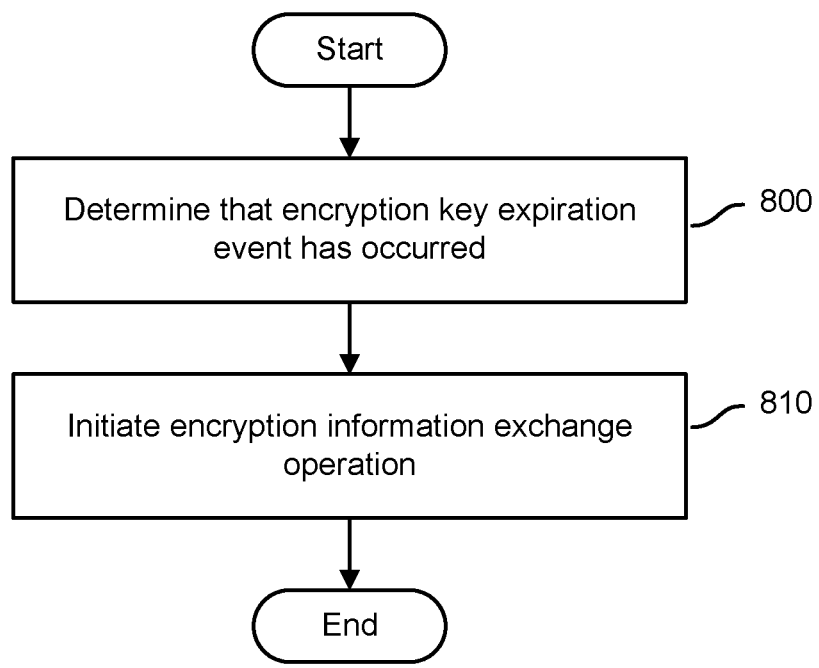
FIG. 8 is a flowchart illustrating embodiments of a process of regenerating encryption keys.

FIG. 8 is a flowchart illustrating embodiments of a process of regenerating encryption keys. In various embodiments, the process is performed by the system 100 of FIG. 1. At 800, it may be determined that an encryption key expiration event has occurred. In some embodiments, an encryption key expiration event may occur when a shared encryption key has been used for a period of time (e.g., beyond a predetermined period of time), a security threat is detected, and/or any other condition occurs. An encryption key expiration event may be generated by a management agent, security management platform, managed application, and/or any other node. For example, any of these nodes may determine that the shared encryption key should be expired, and an encryption key expiration event may be generated (e.g., initiated).

At 810, an encryption information exchange operation may be initiated. In some embodiments, a combined key exchange process as discussed herein (e.g., in FIGS. 2-4) may be initiated. For example, a first encryption information (e.g., a first key, a first public key), second encryption information (e.g., second key, second public key), shared encryption key, and/or other information may be determined to be expired. And a key exchange process may be initiated.

In certain cases, only a first encryption information or second encryption information may be determined to be expired and only a portion of the key exchange process may be initiated. In various embodiments, any portion of the key exchange/generation processes discussed herein may be initiated.

Figure 9:
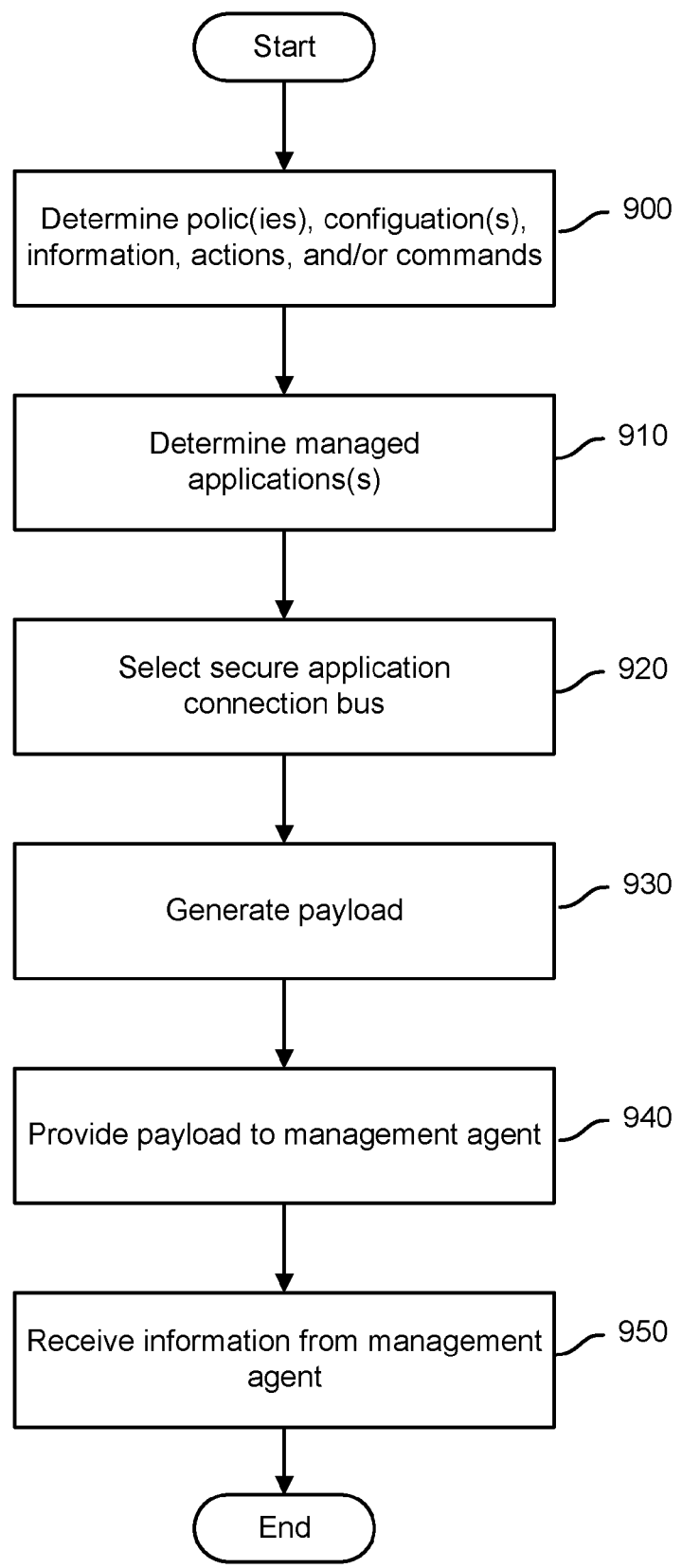
FIG. 9 is a flowchart illustrating a process of mobile application management using a secure application connection bus.

FIG. 9 is a flowchart illustrating a process of mobile application management using a secure application connection bus. In various embodiments, the process is performed by the system 100 of FIG. 1. At 900, configurations, policies, information, settings, actions, and/or commands for one or more managed applications (e.g., managed applications 104 of FIG. 1) may be determined (e.g., defined) at a security management platform (e.g., security management platform 118 of FIG. 1). For example, the configurations, policies, information, actions, enterprise authentication information, and/or settings may be received from a user (e.g., administrator) of the security management platform.

In some embodiments, configurations may affect, control, and/or govern the operation of an application. For example, a mobile application may require certain configuration information (e.g., configurations), settings, and/or other information to operate. Configuration information may include, for example, server information (e.g., server name and internet protocol (IP) address), user information (e.g., username, password, and/or device certificate to identify an application and/or device to a server), and/or other information. Configuration information may, for example, include the server(s) to which an application is configured to connect.

In various embodiments, policies associated with an application (e.g., application policies) may be used to control, manage, and/or govern the operations of an application. Policies may, for example, be determined based on enterprise polic(ies), location of device, security state of device, other application installation state, a user's group changes, and/or other information. Example policies may include, for example, hardware control policies (e.g., block application access to the device's camera, Bluetooth®, near-field communication (NFC), universal serial bus (USB), Wi-Fi, and/or other resources (e.g., set by user, group, application, time, location, etc.), storage access control policies (e.g., block access to device storage (e.g., secure digital (SD), Flash, photo, etc.), personal information manager (PIM) access control policies (e.g., block access to device email, calendar, contacts and/or other resources; allow limited access to certain (e.g., only company and not personal) email account(s), calendar, contact, and/or other resources), system service access control policies (e.g., block access to application from system services like AirPrint, shared email, information share with other applications), and/or other policies.

According to some embodiments, information (e.g., application-related information, configuration information) may be provided to an application (e.g., from a security management platform). For example, device information, enterprise information, and/or installed application information may be provided to an application to allow the application to perform functions based on the information. Device information may include, for example, a management ID, media access control (MAC) address, international mobile equipment identity (IMEI), and/or other management token(s). Enterprise information may include, for example, enterprise emergency information, contact information and/or any other enterprise-associated information. Installed application information may include an installed application list with associated capabilities (e.g., open-in documents, secure copy-paste support, etc.).

In various embodiments, settings associated with an application may be used to manage, govern, and/or control the operation and/or functionality of an application. Settings may include, for example, application firewall settings and/or other settings. Application firewall rules/settings may validate and/or protect an application from receiving untrusted data. For example, application firewall rules may include enforced server certificate validation (e.g., for each secure sockets layer/transport layer security (SSL/TLS) connection, the server certificate will be validated before allowing connection), allowed network rules (e.g., only allow connect to certain networks), augmented address lookup (e.g., instead of relying system's domain name system (DNS) server, application firewall can use secure DNS server which provide additional security with authentic address information (e.g., opendns) and/or using host file pushed by management server), content inspection rules (e.g., client side only inspection and/or server-assisted content inspection to remove any malicious content), and/or other application firewall rules/settings.

In some embodiments, actions may be provided to an application to command the application to execute various operations. Actions may include, for example, a wipe application data action (e.g., wipe application data and return the application to installation state, zero out bytes before deleting), remote lock action (e.g., access to managed application (e.g., enterprise applications) may be locked until a user unlocks the application; in lock state managed/trusted application data may not be accessible to other applications), and/or other actions.

In various embodiments, before allowing access to a secure application, a user may be required to authenticate identity. For example, a user identifier (e.g., User ID), password, personal identification number (PIN), onetime password, NFC, two-dimensional (2D) barcode, and/or other user credentials may be used to validate user of, for example, a managed application. In some embodiments, this validation process may be executed prior to the managed application being granted access to the secure application connection bus. In various, embodiments, user credentials may be required to identify a user, for example, upon opening a protected application.

At 910, one or more managed applications associated with the configurations, policies, information, actions, and/or settings may be determined. In some embodiments, the one or more managed applications may be specified by a user (e.g., administrator). For example, a group of applications may be selected based on user input (e.g., administrator input associated with configuration, policy, and/or other changes).

At 920, a secure application connection bus technique may be selected. In some embodiments, a security management platform (e.g., security management server) may determine an appropriate secure connection bus approach for deployment of information to the managed application. The secure connection bus approach may be determined based on one or more parameters including the content of the information to be transferred to the application, the level of security required for transmission, the security state of the device, attributes associated with the managed application, and/or any other parameters. For example, it may be determined that encrypted inter-application data transfer via shared storage location (e.g., pasteboard) is more secure than transferring data using a URL scheme-based approach or transferring data using the native MDM management framework (e.g., an iOS MDM framework). Based at least in part on the level of security required for the data transfer, one of the secure connection bus techniques may be selected.

In some embodiments, a MDM system native to the mobile device may be used as a secure application connection bus. For example, a mobile device operating system (e.g., iOS) may include a native MDM framework (e.g., an MDM framework included in the operating system), and this native MDM framework may be used as a secure connection bus to transfer information between applications on the mobile device. In some embodiments, this native MDM based technique may be less secure than other secure application connection bus techniques discussed herein. In some embodiments, the native MDM-based secure connection bus technique may be a back-up technique and/or may be used in scenarios in which requirements for secure data transfer are reduced.

At 930, a payload may be generated (e.g., by the security management platform). According to various embodiments, the configurations, policies, information, actions, and/or settings may be compiled with one or more parameters specific to a device user, mobile device, and/or application(s). The parameters may, for example, include changing $USER_ID$ to actual user id for login, issue identity certificate for user/device, and/or other parameters. In some embodiments, the information (e.g., compiled information) may be encrypted to generate an encrypted payload (e.g., at the security management platform). In various embodiments, the information may be compiled into a payload and passed to the management agent on the device unencrypted.

At 940, the payload may be provided to the management agent. In some embodiments, an encrypted payload may be provided to (e.g., pushed to) the management agent for deployment to the managed application(s). In various embodiments, the information is provided (e.g., pushed) to the management agent may be unencrypted, and the management agent may encrypt the payload (e.g., prior to transfer to a managed application).

In some embodiments, the security management platform may specify (e.g., push) to the management agent a secure application connection bus technique to be used in transferring the payload to the managed application. As discussed below, the management agent may securely transfer the encrypted payload to the managed application using the secure application connection bus technique(s) specified by the security management platform.

At 950, information may be received from the management agent. In some embodiments, the management agent may provide the security management platform (e.g., security management server) information associated with the managed application (e.g., information from the managed application). For example, the management agent may receive response information from the managed application in response to the payload. This response information may be passed to the security management platform. The security management platform may process (e.g., analyze) the update information associated with the managed application. The security management platform may perform operations based at least in part on the information from the managed application.

By way of example, in the event the update information associated with the managed application (e.g., from the management agent) does not satisfy a quarantine policy associated with the mobile device, a quarantine command may be sent (e.g., from the security management platform) to a security enforcement node (e.g., security enforcement node 116 of FIG. 1). Upon receipt of a quarantine command, the security enforcement node may restrict (e.g., block) communications between the device and enterprise server(s) (e.g., enterprise server(s) 112 of FIG. 1) and/or other assets. In some embodiments, the security management platform may provide (e.g., in parallel) a quarantine command to the management agent. In some embodiments, the management agent may perform one or more actions based at least in part on the quarantine command including, for example, wipe at least a portion of enterprise data on the device, disable (e.g., lock down) at least one managed application, and/or actions. Other types of operations may of course be performed based on information received from the managed application.

In some embodiments, the security management platform may update one or more stored configuration, policy, settings, and/or other information associated with the managed application.

Figure 10:
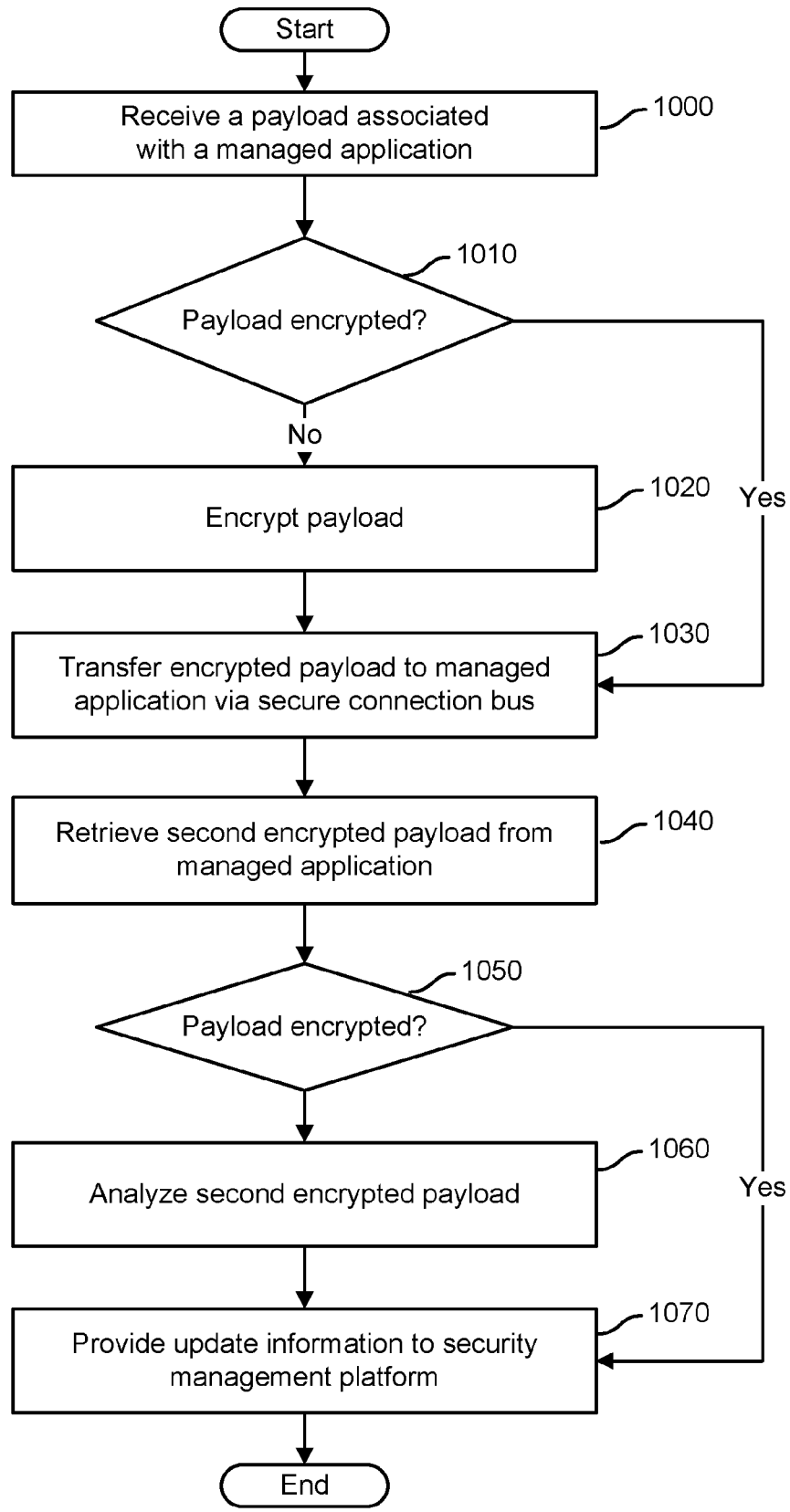
FIG. 10 is a flowchart illustrating a process of mobile application management using a secure application connection bus.

FIG. 10 is a flowchart illustrating a process of mobile application management using a secure application connection bus. In various embodiments, the process is performed by the system 100 of FIG. 1. At 1000, a payload associated with a managed application is received (e.g., at a management agent associated with a mobile device). In some embodiments, the payload may be received from a security management platform (e.g., security management server) and may include configurations, policies, information, actions, and/or settings information associated with a managed application.

At 1010, it may be determined whether the payload is encrypted. As discussed above, a payload may be encrypted at the security management and/or passed to the management agent un-encrypted. In the event the payload is encrypted (e.g., was encrypted at the security management platform), the process may proceed to step 1030. In the event the payload is un-encrypted the process may proceed to step 1020.

At 1020, the payload may be encrypted. In some embodiments, the payload may be encrypted at the management agent using any of the techniques disclosed herein and/or known in the art. In some embodiments, a secure connection bus may have been previously established between the management agent and the managed application. In this case, the payload may be encrypted using the information (e.g., first encryption information and second encryption information as discussed above) shared between the management agent and managed application during the secure connection bus generation/establishment/handshake process.

At 1030, the encrypted payload may be transferred securely to the managed application via the secure connection bus. In some embodiments, the management agent may receive from the security management platform secure connection bus information, which may dictate a secure connection bus technique to be used in transferring the payload to the managed device. For example, the security management platform may command the management agent to transfer the encrypted package to the managed application via a shared storage location (e.g., pasteboard, secure keychain storage, etc.), using a URL scheme associated with managed application, using an MDM platform native to the device, and/or using other secure connection bus approaches.

In some embodiments, the encrypted payload may be decrypted at the managed application (e.g., by a library associated with the managed application). For example, the managed application may have previously received a key (e.g., from the management agent), and the key may be used to decrypt the payload. In some embodiments, a library associated with the managed application may process (e.g., parse, analyze) the payload and apply to the managed application the configuration changes, policies (e.g., policy updates), actions, and/or settings included therein.

At 1040, a second encrypted payload may be received (e.g., at the management agent from the managed application). In some embodiments, the managed application may execute the configuration changes, policy updates, setting changes, and/or actions included in the encrypted package (e.g., received from the management agent). Upon execution of the actions, the managed application may generate a second encrypted package including update information (e.g., based on the executed actions). This second encrypted payload may be passed to the management agent (e.g., using a secure connection bus technique).

At 1050, it may be determined whether the second payload is encrypted. In various embodiments, the second payload may be encrypted at the managed application. For example, the second encrypted payload may be encrypted in such a manner that the management agent is unable to parse, process, and/or analyze the contents of the second encrypted payload. In the event the payload is encrypted (e.g., was encrypted at the managed application), the process may proceed to step 1070. In the event the payload is unencrypted the process may proceed to step 1060.

At 1060, the second encrypted payload may be parsed, processed, and/or analyzed at the management agent. In some embodiments, the management agent may process, interpret, and/or analyze the update information included in the second encrypted payload. The management agent may, in certain instances, perform operation(s) based at least in part on the update information. For example, in the event local policy enforcement is enabled (e.g., by the security management platform), the management agent may push configuration updates to the device when certain policy conditions are satisfied.

At 1070, the management agent may provide (e.g., pass) the update information (e.g., included in the second encrypted information from the managed application) to the security management platform. The security management platform may perform one or more operations (e.g., execute quarantine action(s), update configurations, update policies, and other actions discussed above) based on the update information from the managed application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
providing, from a first mobile application of a mobile device to a second mobile application of the mobile device via a first uniform resource locator (URL), information that includes a first encryption information associated with the first mobile application of the mobile device, an identifier of a shared storage location, and a first mobile application identifier, wherein the first mobile application is a management agent associated with a management server and the second mobile application is a managed application, wherein the second mobile application is configured to validate the first mobile application based in part on the information, wherein in response to validating the first mobile application, the second mobile application is configured to provide second encryption information to the first mobile application via a second URL and a message indicating the second encryption information has been sent via the second URL to the shared storage location;
receiving, at the first mobile application of the mobile device from the second mobile application of the mobile device via the second URL, the second encryption information associated with the second mobile application of the mobile device;
validating, by the first application, an identity of the second mobile application based in part on a payload of the second URL;
generating a shared encryption key based at least in part on the first encryption information and the second encryption information; and
using the shared encryption key to encrypt data to be transferred from the first mobile application of the mobile device to the second mobile application of the mobile device via the shared storage location, wherein the management server is configured to manage the second mobile application via the encrypted data provided by the first mobile application.

2. The method of claim 1, wherein using the shared encryption key to encrypt the data comprises:
encrypting the data using the shared encryption key in a symmetric key encryption operation.

3. The method of claim 1, wherein generating the shared encryption key comprises combining the first encryption information and second encryption information.

4. The method of claim 3, wherein combining comprises combining the first encryption information and second encryption information using a binary XOR operation.

5. The method of claim 1, wherein receiving the second encryption information associated with the second mobile application includes:
receiving a request to open the second URL including the second encryption information;
verifying that a source associated with the second URL includes the second mobile application; and
processing the second URL to retrieve the second encryption information.

6. The method of claim 1, further comprising:
storing one or more of the first encryption information, the second encryption information, and the shared encryption key at a secure storage location.

7. The method of claim 1, wherein the first encryption information and second encryption information include public keys used in one or more of a Diffie-Hellman key exchange and an elliptic curve Diffie-Hellman key exchange.

8. The method of claim 1, wherein the providing of the first encryption information associated with the first mobile application, receiving of the second encryption information associated with the second mobile application, and generating the shared encryption key steps comprise one or more of a Diffie-Hellman key exchange and an elliptic curve Diffie-Hellman key exchange.

9. The method of claim 1, further comprising:
determining that an encryption key expiration event has occurred; and
initiating an encryption information exchange operation.

10. The method of claim 1, wherein the shared storage location comprises a named pasteboard, and
wherein the named pasteboard is associated with an identifier.

11. The method of claim 1, further comprising, providing an identifier useable to retrieve data from the shared storage location, wherein providing the identifier comprises:

using the shared encryption key to encrypt the identifier; and transferring the encrypted identifier from the first mobile application to the second mobile application.

12. The method of claim 1, further comprising:

retrieving the encrypted data from the shared storage location at the second mobile application; and using the shared encryption key to decrypt the encrypted data.

13. The method of claim 1, further comprising receiving the data at the first mobile application comprising a hub application.

14. The method of claim 13, further comprising:

using a second shared encryption key to encrypt second data to be transferred from the first mobile application to a third mobile application; and providing the encrypted second data to a second shared storage location, wherein the third mobile application is configured to retrieve the encrypted second data from the second shared storage location.

15. The method of claim 1, wherein using the shared encryption information includes using the shared encryption key to encrypt data to be transferred from the first mobile application to a plurality of applications; and providing the encrypted data to be transferred from the first mobile application to a plurality of applications, wherein providing the encrypted data to be transferred from the first mobile application to a plurality of applications includes providing the encrypted data to be transferred from the first mobile application to a plurality of applications to a shared storage location accessible to the plurality of applications, wherein at least one application in the plurality of applications is configured to retrieve the encrypted data.

16. The method of claim 1, wherein the identifier comprises a random name generated by the first mobile application.

17. The method of claim 1, wherein the shared storage location comprises a named pasteboard, and wherein the shared storage location is generated at least in part by invoking a pasteboard generation class method.

18. The method of claim 1, further comprising:

validating, by the second mobile application, the first mobile application; and in response to validating the first mobile application, retrieving, by the second mobile application, the encrypted data from the shared storage location.

19. The method of claim 1, wherein at least one credential associated with the first mobile application is provided in addition to the first encryption information to the second mobile application.

20. The method of claim 19, wherein the at least one credential associated with the first mobile application includes a signature of an identifier associated with the first mobile application.

21. The method of claim 1, wherein the second encryption information includes at least one credential associated with the second mobile application.

22. The method of claim 1, wherein the providing includes providing the first encryption information to the second mobile application using a URL scheme associated with the second mobile application.

23. A system, comprising:

a processor; and a memory coupled with the processor, wherein the memory is configured to provide the processor with instructions which when executed cause the processor to:

provide, from a first mobile application of the system to a second mobile application of the system via a first uniform resource locator (URL), information that includes a first encryption information associated with the first mobile application of the mobile device, an identifier of a shared storage location, and a first mobile application identifier, wherein the first mobile application is a management agent associated with a management server and the second mobile application is a managed application, wherein the second mobile application is configured to validate the first mobile application based in part on the information, wherein in response to validating the first mobile application, the second mobile application is configured to provide second encryption information to the first mobile application via a second URL and a message indicating the second encryption information has been sent via the second URL to the shared storage location;

receive, at the first mobile application of the mobile device from the second mobile application of the mobile device via the second URL, the second encryption information associated with the second mobile application of the mobile device;

validate, by the first application, an identity of the second mobile application based in part on a payload of the second URL;

generate a shared encryption key based at least in part on the first encryption information and the second encryption information; and use the shared encryption key to encrypt data to be transferred from the first mobile application of the mobile device to the second mobile application of the mobile device via the shared storage location, wherein the management server is configured to manage the second mobile application via the encrypted data provided by the first mobile application.

24. The system of claim 23, wherein the memory is further configured to provide the processor with instructions which when executed cause the processor to:

encrypt the data using the shared encryption key in a symmetric key encryption operation.

25. A computer program product, the computer program product being embodied in a tangible non-transitory computer readable storage medium and comprising computer instructions for:

providing, from a first mobile application of a mobile device to a second mobile application of the mobile device via a first uniform resource locator (URL), information that includes a first encryption information associated with the first mobile application of the mobile device, an identifier of a shared storage location, and a first mobile application identifier, wherein the first mobile application is a management agent associated with a management server and the second mobile application is a managed application, wherein the second mobile application is configured to validate the first mobile application based in part on the information, wherein in response to validating the first mobile application, the second mobile application is configured to provide second encryption information to the first mobile application via a second URL and a message indicating the second encryption information has been sent via the second URL to the shared storage location;

receiving, at the first mobile application of the mobile device from the second mobile application of the mobile device via the second URL, the second encryption information associated with the second mobile application of the mobile device;

validating, by the first application, an identity of the second mobile application based in part on a payload of the second URL;

generating a shared encryption key based at least in part on the first encryption information and the second encryption information; and using the shared encryption key to encrypt data to be transferred from the first mobile application to the second mobile application of the mobile device via the shared storage location, wherein the management server is configured to manage the second mobile application via the encrypted data provided by the first mobile application.

\* \* \* \* \*